United States Patent

Yazaki et al.

[11] Patent Number: 5,492,767
[45] Date of Patent: Feb. 20, 1996

[54] LAMINATED RESIN FILM

[75] Inventors: Takao Yazaki; Masataka Noro; Takashi Matsui; Noriyuki Kobayashi; Mie Toyoda, all of Mie, Japan

[73] Assignee: Mitsubishi Chemical Corporation, Tokyo, Japan

[21] Appl. No.: 85,393

[22] Filed: Jun. 30, 1993

[30] Foreign Application Priority Data

Jul. 7, 1992 [JP] Japan .................................. 4-179882
Nov. 6, 1992 [JP] Japan .................................. 4-297392

[51] Int. Cl.$^6$ .................................................. B32B 27/08
[52] U.S. Cl. ........................ 428/500; 428/515; 428/516
[58] Field of Search ............................. 428/500, 515, 428/516

[56] References Cited

U.S. PATENT DOCUMENTS

| | | | |
|---|---|---|---|
| 4,853,490 | 8/1989 | Bosisio | 174/25 R |
| 5,080,979 | 1/1992 | Shigemoto et al. | 428/520 |
| 5,122,415 | 6/1992 | Shinkel et al. | 428/349 |
| 5,296,304 | 3/1994 | Yazaki et al. | 428/516 |

*Primary Examiner*—W. Robinson H. Clark
*Attorney, Agent, or Firm*—Dilworth & Barrese

[57] ABSTRACT

A laminated resin film having a thickness of from 7 to 25 μm comprised of (A) a poly(4-methylpentene-1) resin layer having a thickness of from 1 to 10 μm having laminated on one or both sides thereof (B) a crystalline propylene copolymer resin layer comprising from 1 to 10% by weight of ethylene, from 74 to 96% by weight of propylene, and from 3 to 25% by weight of an α-olefin containing from 4 to 8 carbon atoms and having a thickness of from 2 to 20 μm, provided that the total thickness of layers (B) when provided on each side of layer (A) is in the range of from 4 to 20 μm. The laminated film has excellent cutting properties and high heat resistance sufficient for use in microwave cooking.

21 Claims, No Drawings

LAMINATED RESIN FILM

FIELD OF THE INVENTION

This invention relates to a laminated resin film and more particularly a food wrap film having excellent adhesion, heat resistance, cutting properties, and feeling to the touch. This invention also relates to a laminated resin film for a bag having excellent low-temperature heat-sealing properties and heat resistance.

BACKGROUND OF THE INVENTION

Food wrap films and cling films are widely used in homes, restaurants, supermarkets, etc. for food preservation in a refrigerator or a freezer, for cooking in a microwave oven or for delivering dishes to a customer's house.

Food wrapping is for prevention of drying (for water retention), dissipation of flavor, absorption of odors from other foodstuffs, contamination with dust, and spilling or spurting of a foodstuff from a container during preservation, microwave cooking or delivery.

Food wrap films for these uses usually have a roll form around a paper winding tube having a width of from 20 to 54 cm to a roll length of from 20 to 100 m and are put in a paper carton box having a saw blade at the upper end of its side. The film is unrolled to a necessary length and cut off by the saw blade.

An iron plate having a thickness of from about 0.2 to 0.3 mm and cut to have a saw-toothed edge is usually used as the saw blade. Recently, a rigid paperboard cut to have a sawtoothed edge is also used. The saw blade, whether made of iron or paper, has a very simple cutting mechanism.

The above-mentioned wrap film is required to have seethrough transparency, resistance to being torn when unrolled, to have self-tack, to have sufficient heat resistance so as not to be fused when used for microwave cooking, and to have satisfactory tearability when cut with a saw blade (hereinafter referred to as cutting properties).

Known materials of wrap films include biaxially stretched vinylidene chloride resins, polyvinyl chloride, and polyethylene resins containing a surface active agent (see JP-B-38-4174, JP-B-43-8606 (the term "JP-B" as used herein means an "examined published Japanese patent application"), and U.S. Pat. No. 4,493,867).

Resin materials comprising chlorine-containing monomers, such as vinyl chloride or vinylidene chloride, involve various problems of food sanitation and environmental conservation, such as suspicion of carcinogenity, migration of plasticizers commonly used in soft vinyl chloride resins into foodstuffs, possibility of generation of dioxin after disposal into soil or on combustion, generation of a chlorine-containing gas on combustion which is one of the causes of acid rain, and the like.

Further, wrap films comprising vinylidene chloride resins or polyvinyl chloride have a disadvantage that an initial tear on cutting propagates to an undesired oblique direction not along the saw blade.

Wrap films made of an ethylene-based resin are free from the problems on combustion. They are easily stretched, but are hard to cut with a saw blade. So its cutting requires a considerable pulling force, the film cannot be cut satisfactorily, or the carton box is deformed. Moreover, they have insufficient heat resistance for microwave cooking and insufficient adhesion to a container, e.g., a PSP tray or a metal or porcelain container, or they are hard to handle due to their limpness. Therefore, polyethylene resin wrap films are incapable of substituting for vinylidene chloride resin films and have a very limited market.

On the other hand, heat-sealable laminated resin films composed of a biaxially stretched polypropylene film having laminated on both sides thereof an ethylene-propylene copolymer film or an ethylene-propylene-butene-1 copolymer film have been proposed as a packaging material for processed foods, such as ham, wiener, bacon, and flakes of dried bonito, fruits, and garments (see JP-A-54-158477 (the term "JP-A" as used herein means an "unexamined published Japanese patent application"), JP-B-61-50974, JP-B-61-29377, and JP-B-3-23332).

Where these polypropylene resin laminated films are used as a bag into which coffee beans are sealed and roasted by radiofrequency induction heating in a microwave oven (see JP-A-2-171144) or as a perforated bag in which wieners are put and warmed as such by heating in a microwave oven, they are required to have improved heat resistance.

As laminated films exhibiting sufficient heat resistance withstanding microwave cooking, there has been proposed a film comprising an equal weight mixture of poly(4-methylpentene-1) and a propylene homopolymer (see JP-A-64-70381) and a 10 to 150 μm thick laminated film composed of a polymethylpentene resin layer and a polypropylene or ethylene-propylene copolymer layer (see JP-A-64-53838).

However, the above-described laminated films require a heat-sealing temperature as high as 145° C. or even higher in bag making. Besides, they are too thick and lack flexibility for serving as a wrap film and have poor cutting properties.

SUMMARY OF THE INVENTION

An object of the present invention is to provide a polyolefin-based laminated resin film exhibiting satisfactory performance properties as a food wrap film, such as cutting properties and heat resistance.

Another object of the present invention is to provide a polypropylene-based heat-sealable laminated resin film having improved heat resistance, improved flexibility, and improved anti-fogging properties.

The above objects of the present invention are accomplished by a laminated resin film having a thickness of from 7 to 25 μm comprised of (A) a poly(4-methylpentene-1) resin layer having a thickness of from 1 to 10 μm having laminated on one or both sides thereof (B) a crystalline propylene copolymer resin layer comprising from 1 to 10% by weight of ethylene, from 74 to 96% by weight of propylene, and from 3 to 25% by weight of an α-olefin containing from 4 to 8 carbon atoms and having a thickness of from 2 to 20 μm, provided that the total thickness of layers (B) when provided on each side of layer (A) is in the range of from 4 to 20 μm.

In a preferred embodiment of the present invention, layer(s) (B) or both of layers (A) and (B) of the laminated resin film contain from 0.5 to 20% by weight of a nonionic surface active agent per one layer. This film exhibits improved self-tack and improved anti-fogging properties.

DETAILED DESCRIPTION OF THE INVENTION

Layer (A) comprising a poly(4-methylpentene-1) resin contributes to heat resistance and satisfactory cutting properties. The poly(4-methylpentene-1) resin which can be used in the present invention includes not only a 4-methylpentene-1 homopolymer but copolymers comprising at least 80 mol % of 4-methylpentene-1 and other α-olefins, e.g., ethylene, propylene, butene-1, hexane-1, octene-1, and heptene-1, both having a density of from 0.830 to 0.840 g/cm³.

From the standpoint of heat resistance and cutting properties, preferred of the poly(4-methylpentene-1) resins are those having a melting point of from 200° to 242° C., a Vicat softening point of from 140° to 175° C. (as measured according to ASTM D-1525-87), a melt flow rate (hereinafter abbreviated as MFR) of from 2 to 180 g/10 min (as measured according to ASTM D-1238-86 at 260° C. under a load of 5 kg), and an elongation at tensile break of not more than 100%, preferably from 15 to 100%, more preferably from 15 to 85%, and particularly preferably from 15 to 30% (as measured according to ASTM D-638- 87 at 23° C. and a pulling speed of 5 mm/min, hereinafter the same).

The poly(4-methylpentene-1) resins which can be used in the present invention are commercially available under the trademark TPX grade designations of RT18, DX820, DX845, MX004, and MX320XB, all produced by Mitsui Petrochemical Industries, Ltd.

Layer (B) comprising a crystalline propylene copolymer resin contributes to heat sealing properties and softness. The crystalline propylene copolymer resin comprises from 74 to 96% by weight of propylene, from 1 to 10% by weight of ethylene, and from 3 to 25% by weight of an α-olefin.

Preferred propylene copolymer resins include those having an ethylene content of from 1.5 to 4% by weight, a butene-1 content of from 8 to 20% by weight, and a propylene content of from 76 to 90.5% by weight and having an MFR of from 1 to 12 g/10 min (as measured according to ASTM D-1238-86 at 230° C. under a load of 2.16 kg), a heat sealing temperature of from 120° to 140° C., preferably from 120° to 135° C., and a degree of crystallinity of from 20 to 55%, preferably from 20 to 40% (as measured by an X-ray method, hereinafter the same).

The crystalline propylene copolymer resins to be used in the present invention are prepared by feeding 0.5 to 12% by weight, preferably 0.5 to 4.0% by weight, of ethylene, 60 to 98.5% by weight, preferably 75 to 92% by weight, of propylene, and 1.0 to 30% by weight, preferably 5 to 20% by weight, of an α-olefin to a polymerization system and conducting random copolymerization in the presence of a Ziegler-Natta catalyst as disclosed, e.g., in JP-B-55-6643, JP-A-50-79195, and JP-A-54- 162785.

The α-olefin to be copolymerized includes butene-1, pentene-1, hexene-1, heptene-1, octene-1, 4-methylpentene-1, etc. and mixtures of two or more thereof.

Well-known Ziegler-Natta catalysts basically composed of a transition metal compound component and a reducing metal compound component as well as their modifications can be used in the present invention.

While compounds of a metal of the groups IV to VI in the periodic table can be used as transition metal compound component, preferred of them are titanium compounds, such as halides, oxyhalides, alkoxides, and alkoxyhalides. Specific examples of the titanium compounds are titanium halides, such as titanium tetrachloride, titanium tetrabromide, titanium tetraiodide, titanium trichloride, titanium tribromide, titanium triiodide, and titanium dichloride, with titanium trichloride being particularly preferred. These titanium compounds may be used as a mixture of two or more thereof.

A metallic compound whose valence is lower than its highest valence are prepared by reducing a corresponding compound of the metal having the highest valence with hydrogen, a metal, an organometallic compound, a metal hydride, etc. In this case, the reduction product sometimes contains a decomposition or modification product of a reducing agent depending on the kind of the reducing agent and/or the reducing method. Such a reduction product, for example, TiCl$_3$·⅓AlCl$_3$ which can be prepared by reducing titanium tetrachloride with a metallic aluminum may also be used as a transition metal compound component.

The reducing metal compound component suitably includes a hydride or organic compound of a metal of the groups I to III in the periodic table. Particularly suitable reducing metal compounds are aluminum hydride and an organoaluminum compound represented by formula:

$$AlR_nX_{3-n}$$

wherein R represents a hydrocarbon residue, and particularly an alkyl, cycloalkyl or aryl group having not more than about 8 carbon atoms; X represents a halogen atom; and n represents 1, 1.5, 2 or 3. For economical reasons, X in the above formula is suitable chlorine.

Specific examples of the organoaluminum compounds include a trialkylaluminum having up to 8 carbon atoms, preferably not more than about 4 carbon atoms, in the alkyl moiety thereof, a dialkylaluminum chloride, an alkylaluminum sesquichloride, an alkylaluminum dichloride, etc. and mixtures of two or more thereof.

A ratio of the transition metal compound component to the reducing metal compound component is arbitrarily selected from the range generally used for Ziegler-Natta catalysts. For example, a catalyst system composed of a titanium compound (A) and an organoaluminum compound (B) has a B/A molar ratio of from about 0.5 to about 20, and preferably from 1 to 10.

It is known that a Ziegler-Natta catalyst basically composed of the above-mentioned two components may be modified with various modifiers. Typically included in such modifiers are electron donating compounds, such as acid anhydrides, esters, ketones, amines, glycols, and glycol ethers. Methyl methacrylate may be mentioned as a specific example of the modifiers.

The copolymerization can be carried out either in a gaseous phase or in a liquid phase using an inert organic solvent, such as a hydrocarbon (e.g., benzene, toluene, xylene, pentane, hexane, heptane or cyclohexane) or a halogenated hydrocarbon (e.g., chlorobenzene or methylene chloride), or using the above-mentioned monomer(s) such as an α-olefin as a solvent at an arbitrarily selected temperature (e.g., from about 0° to about 200° C., preferably from 30° to 100° C.) under an arbitrarily selected pressure (e.g., from atmospheric pressure to about 100 atm., preferably from atmospheric pressure to 60 atm). If desired, a molecular weight regulator, such as hydrogen, may be used.

The above-mentioned crystalline propylene copolymer resins are commercially available from Mitsubishi Petrochemical Co., Ltd. under the trademark MITSUBISHI POLYPRO SPX 4400 or SPX 1796 and from Sumitomo Chemical Co., Ltd. under the trademark SUMITOMO NOBLEN FL6316.

A resin film comprising a propylene homopolymer has a melting point as high as about 162° to 167° C. (as a peak temperature of the DSC curve) and requires a heat sealing temperature of about 170° C. or higher. In addition, a laminate of such a propylene homopolymer layer and layer (A) will be too rigid (with no flexibility) to closely fit an object to be wrapped with. A resin film comprising a propylene-ethylene random copolymer having an ethylene content of from 1.5 to 6% by weight has a melting point of from 145° to 155° C., which is lower than that of the propylene homopolymer, and provides a laminated film with slightly reduced rigidity, but the effects of improving heat sealability and flexibility are insufficient.

The heat-sealing temperature as referred to in the present invention was measured as follows. Polypropylene resin film samples were heat sealed by means of a hot plate type heat sealer ("Heat Sealer Model 2" manufactured by Toyo Tester Co., Ltd.) at a varied temperature under a pressure of 3 kg/cm$^2$(G) for a sealing time of 6 seconds. A peel test on a 2 cm wide and 10 cm long specimen of the thus heat-sealed sample was conducted with a Schopper tensile tester manufactured by Toyo Seiki Co., Ltd. at a pulling speed of 500 mm/min at an angle of 180°, and the maximum peel strength was taken as a sealing strength. A temperature giving a sealing strength of 1000 g/2 cm as above measured was taken as a heat sealing temperature.

If the propylene unit content in the crystalline propylene copolymer resin is less than 74% by weight, the resulting copolymer resin becomes rubbery, which makes film formation difficult and only provides a film with impaired transparency. If it exceeds 96% by weight, the copolymer has a higher melting point, exhibits increased rigidity and reduced flexibility, and requires a higher heat sealing temperature. If the ethylene unit content is less than 1% by weight, slurry polymerization is difficult, and no effect of improving heat sealability is obtained. If it exceeds 10% by weight, the crystallinity and moldability of the copolymer is impaired, and the resulting film has reduced transparency. If the α-olefin unit content is less than 3% by weight, the effect of improving low-temperature heat sealing properties becomes small. If it exceeds 25% by weight, the resulting film has impaired transparency.

If desired and unless film transparency is impaired, layer (B) may contain, in addition to the above-mentioned propylene copolymer, up to 20% by weight of other resinous components for the purpose of improving softness or self-tack of the laminated resin film of the present invention. Other resinous components which can be incorporated into layer (B) include an ethylene-vinyl acetate copolymer having a vinyl acetate content of from 5 to 25% by weight, an ethylene-acrylic acid copolymer having an acrylic acid content of from 5 to 20% by weight, an ethylene-methyl acrylate copolymer having a methyl acrylate content of from 5 to 20% by weight, an ethylene-methyl methacrylate copolymer, low-density polyethylene having a density of from 0.890 to 0.910 g/cm$^3$ and a melt index of from 0.1 to 10 g/10 min, and linear low-density polyethylene having a density of from 0.886 to 0.920 g/cm$^3$.

For use as a wrap film and in order to improve the self-tack and anti-fogging properties of the laminated resin film, it is preferable to incorporate a surface active agent effective for these properties, particularly a nonionic surface active agent, into layer (B) or both layers (A) and (B) in an amount of from 0.5 to 20% by weight, preferably from 3 to 20% by weight, and more preferably from 3 to 12% by weight per one layer.

Nonionic surface active agents which can be added to this effect include (a$_1$) a glyceride represented by formula (I):

wherein any one of R$^1$, R$^2$, and R$^3$ represents an acyl group having from 2 to 6 carbon atoms; another one of them represents an acyl group having from 8 to 22 carbon atoms; and the remainder of them represents a hydrogen atom or an acyl group having from 2 to 22 carbon atoms.

Specific examples of glycerides (a$_1$) are glycerol diacetate monooleate, glycerol diacetate monolaurate, glycerol diacetate monopalmitate, glycerol monoacetate dioleate, glycerol monoacetate dilaurate, glycerol monoacetate monopalmitate, glycerol monoacetate monooleate, glycerol monoacetate monolaurate, glycerol monoacetate monocaprylate, glycerol monoacetate brassidate, glycerol monopropionate monobrassidate, glycerol monoacetate monoerucate, and glycerol dipropionate monolaurate.

The nonionic surface active agents to be used further include (a$_2$) a fatty acid ester containing at least one alcoholic hydroxyl group which is obtained from a higher fatty acid having from 12 to 22 carbon atoms and an aliphatic polyhydric alcohol. Specific examples of esters (a$_2$) are glycerol monooleate, polyglycerol mono- or dioleate, glycerol mono- or diricinoleate, propylene glycol oleate, propylene glycol laurate, pentaerythritol oleate, polyethylene glycol oleate, polypropylene glycol oleate, sorbitan oleate, sorbitan laurate, sorbitan linolate, polyethylene glycol sorbitan oleate, polyethylene glycol sorbitan laurate, and polyglycerol polyricinoleate.

Further included in the useful nonionic surface active agents are polyoxyethylene glycerol, polyoxypropylene glycerol, polyethylene glycol, polypropylene glycol, sucrose fatty acid esters, epoxidized soybean oil, polyoxyethylene alkylamine fatty acid esters, and polyoxyethylene alkylphenyl ethers.

If the amount of the surface active agent exceeds 20% by weight, much bleeding occurs to deteriorate the appearance of the laminated resin film. Amounts less than 0.5% by weight bring about insufficient effects on softness and self-tack.

Where in particular glyceride (a$_1$) and fatty acid ester (a$_2$) are used in combination at a weight ratio of ⅔ to ⁸⁄₂, the laminated resin film exhibits improved flexibility and feel to the touch.

From the standpoint of self-tack, it is preferable to incorporate polyglycerol polyricinoleate which is liquid at room temperature and represented by formula (II):

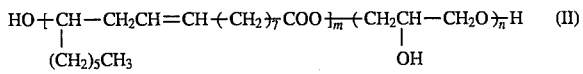

wherein m represents an integer of from 2 to 10; and n represents an integer of from 2 to 20, into layer (B). The compound of formula (II) is a condensation ester between polyricinoleic acid and polyglycerol. The compound of formula (II) wherein m and n each averages 4 is commercially available from Riken Vitamin Co., Ltd. under the trademark POEM PR100 (viscosity: 2770 cps (30° C.); HLB: 0.5).

If desired, resin layers (A) and/or (B) may further contain a nucleating agent (e.g., silica powder) or a stabilizer (e.g., butylated hydroxytoluene) in an amount of from 0.01 to 1% by weight.

The laminated resin film of the present invention is composed of resin layer (A) having a thickness of from 1 to 10 μm having laminated on at least one side thereof resin layer (B) having a thickness of from 2 to 20 μm and has a total film thickness of from 7 to 25 μm.

Since a poly(4-methylpentene-1) resin cannot be independently formed into a film having a thickness of less than 25 μm, layer (A) is formed by T-die co-extrusion or circular-die co-extrusion together with the propylene copolymer resin as layer (B) (see JP-A-64-53838). In some detail, resins for layers (A) and (B) are melt-kneaded in separate extruders, and each of the molten resins is fed to the same multi-layer co-extrusion die or a laminating system composed of a multi-layer feed block and a die and co-extruded from the die, followed by cooling (T-die extrusion). A blow-up ratio (BUR) in blown-film extrusion is from 1.5 to 20, and preferably from 2 to 16.

If the thickness of layer (A) is less than 1 μm, the laminated resin film is difficult to cut with a saw blade due to easy stretchability and has insufficient heat resistance when used for microwave cooking. If the layer (A) thickness exceeds 10 μm, the laminated resin film has insufficient flexibility for wrapping.

Layer (B) when provided on one side of layer (A) has a thickness of from 2 to 20 μm. If its thickness is less than 2 μm, the laminated resin film has a poor balance between elongation and cutting properties. If it exceeds 20 μm, cutting properties are reduced.

The laminated resin film of the present invention has a haze of not more than 5%, preferably not more than 3%, (as measured according to ASTM D1003-61, hereinafter the same), and an Elmendorf tear strength of from 2 to 250 kg/cm in the machine direction (hereinafter abbreviated as MD) and of from 2 to 50 kg/cm in the transverse direction (hereinafter abbreviated as TD) (as measured according to ASTM D1922-67, hereinafter the same). The heat sealing temperature in heat sealing laminated resin films with layers (B) facing each other is from 120° to 135° C.

The present invention will now be illustrated in greater detail with reference to Examples in view of Comparative Examples, but it should be understood that the present invention is not construed as being limited thereto. All the percents, parts, and ratios are by weight unless otherwise specified.

Performance properties of the laminated resin films prepared were evaluated as follows.

1) Heat Resistance

A 5 cm wide and 20 cm long test specimen with a weight of 10 g at one end thereof was suspended in a constant temperature atmosphere for 1 hour, and the temperature at which the specimen tore was measured. The higher the temperature, the higher the endurance to heating of microwave cooking.

2) Cutting Properties, Self-Tack, Feel, and Wrapping Properties

These properties were rated according to the following standard:

5 . . . Good
4 . . . Slightly good
3 . . . Medium
2 . . . Slightly poor
1 . . . Poor

EXAMPLE 1

Poly(4-methylpentene-1) resin (A) (TPX-RT18, a product of Mitsui Petrochemical Industries, Ltd.; density: 0.833 g/cm³; melting point: 240° C., MFR: 26 g/10 min; elongation at break: 25%, hereinafter referred to as TPX-RT18) was melt-kneaded in an extruder having a diameter of 50 mm and an L/D ratio of 25 at 280° C. and led to an intermediate layer of a three-layered T-die. Separately, resin composition (B) comprising 90.0 parts of a propylene-ethylene-butene-1 (88.7/2.4/9.3) random copolymer (MITSUBISHI POLYPRO SPX4400, a product of Mitsubishi Petrochemical Co., Ltd.; density: 0.896 g/cm³, MFR: 5.0 g/10 min; degree of crystallinity: 35%; heat sealing temperature: 127° C.; hereinafter referred to as SPX4400), 10 parts of polyglycerol oleate (RIKEMAL O 71D, a product of Riken Vitamin Co., Ltd.; hereinafter referred to as O71D), and 0.1 part of erucamide was melt-kneaded in an extruder having a diameter of 65 mm and an L/D ratio of 25 at 250° C. and fed to the upper and lower layers of the same three-layered T-die. Resins (A) and (B) were co-extruded from the T-die, cooled by a cooling roll, and slit into a 300 mm wide strip having a B/A/B three layer structure having a thickness of 4/3/4 μm.

COMPARATIVE EXAMPLE 1

Linear low-density polyethylene (MITSUBISHI POLYETH LL UF240, a product of Mitsubishi Petrochemical Co., Ltd.; MI: 2.0; ethylene content: 92.0%; butene-1 content: 8.0%; hereinafter referred to as UF240) was kneaded in an extruder having a diameter of 65 mm and an L/D ratio of 25 at 180° C. Separately, a resin composition comprising 98.5% of an ethylene-vinyl acetate copolymer resin (vinyl acetate content: 15%; MI at 190° C.: 2.0 g/10 min; hereinafter abbreviated as EVA) and 1.5% of monoglycerol oleate (RIKEMAL OL 100, a product of Riken Vitamin Co., Ltd.; hereinafter referred to as OL100) was kneaded in an extruder having a diameter of 50 mm and an L/D ratio of 25 at 160° C. Both the molten resins were fed to a three-layered circular-die with the UF240 layer as intermediate layer and co-extruded and blown at a die temperature of 185° C., a blow-up ratio of 5.0, and a take-off speed of 50 m/min to obtain a three-layered wrap film having a total thickness of 11 μm (4/3/4 μm).

EXAMPLES 2 TO 8 AND COMPARATIVE EXAMPLES 2 TO 5

A laminated resin film was prepared in the same manner as in Example 1, except for using the resin or resin composition shown in Table 1 below as layer (A) or (B) with the respective thickness and at the respective extrusion temperature as shown.

Resin materials and additives used are symbolized in Table 1 (and Table 3 hereinafter described) as follows.

Poly(4-methylpentene-1) Resin

TPX-RT18: As explained in Example 1

TPX MX320XB: A product of Mitsui Petrochemical Industries, Ltd.; density: 0.834 g/cm³; melting point: 240° C.; MFR: 26 g/10 min; elongation at break: 85%

TPX DX845: A product of Mitsui Petrochemical Industries, Ltd.; density: 0.835 g/cm³; melting point: 240° C.; MFR: 8 g/10 min; elongation at break: 25%

Polypropylene Resin

Propylene-ethylene-butene-1 Random Copolymer
  SPX4400: As explained in Example 1
  SPX1796: A product of Mitsubishi Petrochemical Co., Ltd.; propylene content: 85.8%; ethylene content: 1.7%; butene-1 content: 12.5%; MFR: 5 g/10 min; degree of crystallinity: 30%; heat sealing temperature: 126° C.
Propylene-ethylene Random Copolymer
  FX4: A product of Mitsubishi Petrochemical Co., Ltd; propylene content: 95.8%; ethylene content: 4.2%; MFR: 9 g/10 min; degree of crystallinity: 35%; heat sealing temperature: 145° C.
Propylene Homopolymer FB3: A product of Mitsubishi Petrochemical Co., Ltd.; MFR: 2.5 g/10 min; degree of crystallinity: 64%; heat sealing temperature: 170° C.
Linear Low-Density Polyethylene
  UF240: As explained in Comparative Example 1
Ethylene-Vinyl Acetate Copolymer
  EVA: As explained in Example 1
Polybutene-1
  PB8640: A product of Shell Chemical Co., Ltd.
  HV35: A product of Nippon Petrochemical Co., Ltd.; molecular weight: 750
Additives
  O71D: As explained in Example 1
  EA: Erucamide
  SBO: Sorbitan oleate
  OL100: As explained in Comparative Example 1
  PL002: Glycerol diacetate monolaurate, a product of Riken Vitamin Co., Ltd.
  PL004: A deodorized product of PL002
  O250: Sorbitan mono-/di-oleate, a product of Riken Vitamin Co., Ltd.
  POEM: Polyglycerol polyricinoleate, a product of Riken Vitamin Co., Ltd.

For reference, the same properties of a commercially available vinylidene chloride resin wrap film (a product of K Company) are also shown in Table 2 as Reference Example 1.

TABLE 1

| Example No. | Layer (A) Resin | Extrusion Temp. | Layer (B) Resin (Heat Sealing Temp.) | | Additive | | Extrusion Temp. |
|---|---|---|---|---|---|---|---|
| Example 1 | TPX-RT18 | 280° C. | SPX4400 (127° C.) | 90 parts | O71D<br>EA | 10 parts<br>0.1 part | 250° C. |
| Compar. Example 1 | UF240 | 180° C. | EVA (100° C.) | 98.5 parts | OL100 | 1.5 parts | 160° C. |
| Example 2 | TPX-MX320XB | 280° C. | SPX4400 (127° C.) | 90 parts | O71D<br>EA | 10 parts<br>0.1 part | 250° C. |
| Compar. Example 2 | FB3 | 240° C. | SPX4400 (127° C.) | 90 parts | O71D<br>SBO | 5 parts<br>5 parts | " |
| Compar. Example 3 | TPX-RT18 | 280° C. | FB3 (170° C.) | 90 parts | O71D<br>SBO | 5 parts<br>5 parts | 240° C. |
| Compar. Example 4 | PB8640 | 240° C. | SPX4400 (127° C.) | 90 parts | O71D<br>SBO | 5 parts<br>5 parts | 250° C. |
| Compar. Example 5 | TPX-RT18 | 280° C. | FX4 (145° C.) | 90 parts | O71D<br>SBO | 5 parts<br>5 parts | 240° C. |
| Example 3 | " | " | SPX4400 (127° C.) | 90 parts | O71D<br>SBO | 5 parts<br>5 parts | " |
| Example 4 | TPX-RT18 | 280° C. | SPX1769 (126° C.) | 85 parts | O71D<br>EA | 15 parts<br>0.2 part | 250° C. |
| Example 5 | TPX-RT18/<br>SPX4400<br>(90/10) | " | SPX4400 (127° C.) | 85 parts | O71D<br>EA | 15 parts<br>0.2 part | " |
| Example 6 | TPX-RT18 | " | SPX4400 (127° C.) | 90 parts | O71D<br>EA | 10 parts<br>0.1 part | " |
| Example 7 | " | " | SPX4400 (127° C.) | 100 parts | O71D | 0.5 part | " |
| Example 8 | " | " | SPX4400 (127° C.)<br>UF240 (130° C.) | 80 parts<br>10 parts | O71D<br>EA | 10 parts<br>0.1 part | " |

Physical properties and performance properties of each laminated resin film prepared in Examples 1 to 8 and Comparative Examples 1 to 5 are shown in Table 2 below.

TABLE 2

| | Layer Thick- | Tensile Strength | Tensile Elongation | Tear Strength | Heat |

| Example No. | ness (μm) | Haze (%) | MD/TD (kg/cm²) | MD/TD (%) | MD/TD (kg/cm) | Resistance (°C.) | Cutting Properties | Wrapping Properties |
|---|---|---|---|---|---|---|---|---|
| Example 1 | 4/3/4 | 1.6 | 320/290 | 240/600 | 15/12 | 150 | 5 | 4 |
| Compar. Example 1 | 4/3/4 | 3.2 | 330/330 | 330/460 | 34/200 | 110 | 1 | 2 |
| Refer. Example 1 | 11 | 0.6 | 680/810 | 25/30 | 20/19 | 140 | 4 | 4 |
| Example 2 | 4/3/4 | 1.4 | 340/280 | 250/580 | 70/20 | 150 | 4 | 4 |
| Compar. Example 2 | 4/3/4 | 1.8 | 360/270 | 330/570 | 40/400 | 135 | 1 | 4 |
| Compar. Example 3 | 4/3/4 | 1.7 | 360/280 | 60/480 | 9/10 | 150 | 3 | 3 |
| Compar. Example 4 | 2/7/2 | 2.3 | 700/200 | 94/570 | 8/56 | 120 | 2 | 3 |
| Compar. Example 5 | 4/3/4 | 2.0 | 340/300 | 240/500 | 12/10 | 150 | 4 | 2 |
| Example 3 | 4/3/4 | 1.6 | 340/240 | 80/520 | 10/12 | 150 | 3 | 4 |
| Example 4 | 4/3/4 | 1.5 | 290/260 | 210/570 | 11/9 | 150 | 5 | 4 |
| Example 5 | 4/3/4 | 1.8 | 360/280 | 350/580 | 11/18 | 148 | 3 | 4 |
| Example 6 | 7/4 | 2.0 | 280/290 | 120/200 | 10/8 | 150 | 5 | 3 |
| Example 7 | 4/3/4 | 1.6 | 360/330 | 280/610 | 20/15 | 150 | 4 | 3 |
| Example 8 | 4/4/4 | 1.8 | 310/300 | 260/650 | 30/22 | 150 | 3 | 4 |

EXAMPLE 9

Resin mixture (A) comprising 95% of poly(4-methylpentene-1) resin (TPX-RT18) and 5% of glycerol diacetate monolaurate (PL004) was melt-kneaded in an extruder having a diameter of 50 mm and an L/D ratio of 25 at 280° C. and led to an intermediate layer of a three-layered T-die. Separately, resin composition (B) comprising 95 parts of a propylene-ethylene-butene-1 (88.7/2.4/9.3) random copolymer (SPX4400) and 5 parts of polyglycerol oleate (O71D) was melt-kneaded in an extruder having a diameter of 65 mm and an L/D ratio of 25 at 250° C. and fed to the upper and lower layers of the same three-layered T-die. Resins (A) and (B) were co-extruded from the T-die, cooled by a cooling roll, and slit into a 300 mm wide strip having a B/A/B three layer structure having a total thickness of 13 μm (B/A/B=4.7/3.6/4.7 μm).

COMPARATIVE EXAMPLE 6

A laminated resin film was prepared in the same manner as in Example 9, except for using poly(4-methylpentene-1) resin (TPX-RT18) as an intermediate resin layer (A) and using a resin composition comprising 77% of a propylene-ethylene random copolymer (FX4) and 20% of polybutene (HV35) and 3% of glycerol diacetate monolaurate (PL002) as outer layers (B).

EXAMPLES 10 TO 17

A laminated resin film was prepared in the same manner as in Example 9, except for using the resin or resin composition shown in Table 3 as layer (A) or (B) at the respective extrusion temperature as shown.

TABLE 3

| Example No. | Layer (A) | | | | Layer (B) | | | |
|---|---|---|---|---|---|---|---|---|
| | Resin (wt %) | | Additive (wt %) | | Extrusion Temp. (°C.) | Resin (wt %) | | Additive (wt %) | | Extrusion Temp. (°C.) |
| Example 9 | TPX-RT18 | (95) | PL004 | (5) | 270 | SPX4400 | (95) | O71D | (5) | 250 |
| Compar. Example 6 | TPX-RT18 | (100) | — | | " | FX4 | (77) | HV35 PL002 | (20) (3) | " |
| Example 10 | TPX-RT18 | (95) | O71D | (5) | " | SPX4400 | (95) | O71D | (5) | " |
| Example 11 | TPX-RT18 | (90) | O71D PL004 | (5) (5) | " | SPX4400 | (95) | O71D PL004 | (5) (5) | " |

TABLE 3-continued

| Example No. | Layer (A) Resin (wt %) | | Layer (A) Additive (wt %) | | Layer (A) Extrusion Temp. (°C.) | Layer (B) Resin (wt %) | | Layer (B) Additive (wt %) | | Layer (B) Extrusion Temp. (°C.) |
|---|---|---|---|---|---|---|---|---|---|---|
| Example 12 | TPX-RT18 | (95) | O71D | (5) | " | SPX1796 | (95) | O71D | (5) | " |
| Example 13 | TPX-DX845 | (95) | O71D | (5) | " | SPX4400 | (95) | O71D | (5) | " |
| Example 14 | TPX-RT18 | (95) | O71D | (5) | " | SPX4400 | (95) | O250 | (5) | " |
| Example 15 | TPX-RT18 | (95) | PL004 | (5) | " | SPX4400 | (97) | PL004 | (3) | " |
| Example 16 | TPX-RT18 | (95) | PL004 | (5) | " | SPX4400 | (97) | POEM | (3) | " |
| Example 17 | TPX-RT18 | (90) | PL004 O71D | (5) (5) | " | SPX4400 | (95) | POEM | (5) | " |

Physical properties and performance properties of each laminated resin film prepared in Examples 9 to 17 and Comparative Examples 1 to 4 and 6 are shown in Table 4 below. For reference, the data for Reference Example 1 are also shown in Table 4.

While the invention has been described in detail and with reference to specific examples thereof, it will be apparent to one skilled in the art that various changes and modifications can be made therein without departing from the spirit and scope thereof.

TABLE 4

| Example No. | Layer Thickness (μm) | Haze (%) | Gloss (%) | Tensile Strength MD/TD (kg/cm$^2$) | Tensile Elongation MD/TD (%) | Tear Strength MD/TD (kg/cm) | Tensile Modulus MD/TD (kg/cm$^2$) | Heat Resistance (°C.) | Cutting Properties | Self-Tack | Feel |
|---|---|---|---|---|---|---|---|---|---|---|---|
| Example 9 | 4.7/3.6/4.7 | 1.2 | 115 | 340/270 | 120/530 | 62/8 | 7200/6100 | 150 | 5 | 4 | 4 |
| Compar. Example 6 | 4.7/3.6/4.7 | 2.6 | 108 | 270/250 | 160/560 | 83/12 | 8200/7100 | 150 | 4 | 3 | 2 |
| Reference Example 1 | 11 | 0.6 | 163 | 680/810 | 25/30 | 20/19 | 5000/4000 | 140 | 4 | 4 | 4 |
| Example 10 | 4.7/3.6/4.7 | 0.8 | 120 | 360/260 | 80/550 | 13/6 | 8300/6800 | 150 | 5 | 4 | 3 |
| Example 11 | 4.7/3.6/4.7 | 1.6 | 120 | 300/270 | 120/510 | 65/6 | 5100/4900 | 150 | 5 | 4 | 5 |
| Example 12 | 4.7/3.6/4.7 | 0.7 | 122 | 330/240 | 90/560 | 16/8 | 7900/6600 | 150 | 5 | 4 | 3 |
| Example 13 | 4.7/3.6/4.7 | 0.9 | 118 | 340/260 | 80/540 | 19/10 | 8100/6700 | 150 | 5 | 4 | 3 |
| Example 14 | 5.5/2.0/5.5 | 1.2 | 116 | 350/250 | 90/570 | 15/9 | 8200/6700 | 150 | 5 | 4 | 3 |
| Example 15 | 4.0/5.0/4.0 | 1.5 | 120 | 320/280 | 160/520 | 94/7 | 7100/6000 | 150 | 5 | 4 | 4 |
| Compar. Example 1 | 4.0/3.0/4.0 | 3.2 | 122 | 330/330 | 330/460 | 34/200 | 1800/1500 | 110 | 1 | 5 | 2 |
| Compar. Example 2 | 4.0/3.0/4.0 | 1.8 | 106 | 360/270 | 330/570 | 40/400 | 4200/3900 | 135 | 1 | 3 | 2 |
| Compar. Example 3 | 4.0/3.0/4.0 | 1.7 | 102 | 360/280 | 60/480 | 9/10 | 9100/8200 | 150 | 3 | 2 | 2 |
| Compar. Example 4 | 2.0/7.0/2.0 | 2.3 | 114 | 700/200 | 94/570 | 8/56 | 3800/3800 | 120 | 2 | 3 | 2 |
| Example 16 | 4.7/3.6/4.7 | 0.9 | 117 | 380/290 | 150/570 | 28/3 | 5500/5300 | 150 | 5 | 4 | 4 |
| Example 17 | 4.7/3.6/4.7 | 1.0 | 115 | 360/270 | 140/560 | 34/7 | 5100/150 | 150 | 5 | 4 | 5 |

APPLICATION EXAMPLE

Into a porcelain container were placed 200 ml of stew, and the opening of the container was closely covered with the laminated resin film obtained in Example 1 or 9 or Comparative Example 1. The stew in the container was warmed by heating in a microwave oven for 3 minutes. As a result, the films of Examples 1 and 9 suffered from no break due to fusion and were easily removed from the container. To the contrary, the film of Comparative Example 1 suffered from break due to fusion and was difficult to remove from the container because of the fusion.

As described above, the laminated resin film according to the present invention is excellent in transparency, heat resistance, self-tack, and feel to the touch. It sufficiently withstands use as a wrap film in microwave cooking without suffering from break due to fusion.

What is claimed is:

1. A laminated resin film for food wrap having a thickness of from 7 to 25 μm consisting essentially of (A) a poly(4-methylpentene-1) resin layer having a thickness of from 1 to 10 μm having laminated on both sides thereof (B) a crystalline propylene copolymer resin layer comprising from 1 to 10% by weight of ethylene, from 74 to 96 % by weight of propylene, and from 3 to 25 % by weight of an α-olefin containing from 4 to 8 carbon atoms and having a thickness of from 2 to 20 μm, the total thickness of layers (B) is in the range of from 4 to 20 μm.

2. The laminated resin film as claimed in claim 1, wherein said crystalline propylene copolymer resin is an ethylene-propylene-butene-1 copolymer.

3. The laminated resin film as claimed in claim 2, wherein said crystalline propylene copolymer resin has a degree of crystallinity of from 20 to 55% and a melt flow rate of from 1 to 12 g/10 min.

4. The laminated resin film as claimed in claim 3, wherein said crystalline propylene copolymer resin has a degree of crystallinity of from 20 to 40%.

5. The laminated resin film as claimed in claim 2, wherein said crystalline propylene copolymer resin is an ethylene-propylene-butene-1 copolymer having an ethylene content of from 1.5 to 4% by weight, a propylene content of from 76 to 90.5% by weight, and a butene-1 content of from 8 to 20% by weight.

6. The laminated resin film as claimed in claim 1, wherein said poly(4-methylpentene-1) resin has an elongation at tensile break of from 15 to 100%.

7. The laminated resin film as claimed in claim 1, wherein layer (B) contains from 0.5 to 20% by weight of a nonionic surface active agent.

8. The laminated resin film as claimed in claim 7, wherein said nonionic surface active agent is a compound selected from the group consisting of ($a_1$) a glyceride represented by formula (I):

wherein any one of $R^1$, $R^2$, and $R^3$ represents an acyl group having from 2 to 6 carbon atoms; another one of them represents an acyl group having from 8 to 22 carbon atoms; and the remainder of them represents a hydrogen atom or an acyl group having from 2 to 22 carbon atoms, and ($a_2$) a fatty acid ester containing at least one alcoholic hydroxyl group which is obtained from a higher fatty acid having from 12 to 22 carbon atoms and an aliphatic polyhydric alcohol.

9. The laminated resin film as claimed in claim 8, wherein said glyceride ($a_1$) is selected from the group consisting of glycerol diacetate monooleate, glycerol diacetate monolaurate, glycerol diacetate monopalmitate, glycerol monoacetate dioleate, glycerol monoacetate dilaurate, glycerol monoacetate monopalmitate, glycerol monoacetate monooleate, glycerol monoacetate monolaurate, glycerol monoacetate monocaprylate, glycerol monoacetate brassidate, glycerol monopropionate monobrassidate, glycerol monoacetate monoerucate, and glycerol dipropionate monolaurate.

10. The laminated resin film as claimed in claim 8, wherein said fatty acid ester ($a_2$) is an ester derived from a polyhydric alcohol selected from the group consisting of glycerol, polyglycerol, sorbitol, pentaerythritol, propylene glycol, polyethylene glycol, and polypropylene glycol and a higher fatty acid selected from the group consisting of oleic acid, linoleic acid, and lauric acid.

11. The laminated resin film as claimed in claim 8, wherein said fatty acid ester is selected from the group consisting of glycerol monooleate, polyglycerol oleate, glycerol mono- or diricinoleate, propylene glycol oleate, propylene glycol laurate, pentaerythritol oleate, polyethylene glycol oleate, polypropylene glycol oleate, sorbitan oleate, sorbitan laurate, polyethylene glycol sorbitan oleate, polyethylene glycol sorbitan laurate, and polyglycerol polyricinolate.

12. The laminated resin film as claimed in claim 7, wherein said nonionic surface active agent is liquid polyglycerol polyricinoleate.

13. The laminated resin film as claimed in claim 7, wherein said nonionic surface active agent is selected from the group consisting of polyoxyethylene glycerol, polyoxypropylene glycerol, polyethylene glycol, polypropylene glycol, a sucrose fatty acid esters, epoxidized soybean oil, a polyoxyethylene alkylamine fatty acid ester, and a polyoxyethylene alkylphenyl ethers.

14. The laminated resin film as claimed in claim 1, wherein layer (A) and layer (B) each contains from 0.5 to 20% by weight of a nonionic surface active agent selected from the group consisting of ($a_1$) a glyceride represented by formula (I):

wherein any one of $R^1$, $R^2$, and $R^3$ represents an acyl group having from 2 to 6 carbon atoms; another one of them represents an acyl group having from 8 to 22 carbon atoms; and the remainder of them represents a hydrogen atom or an acyl group having from 2 to 22 carbon atoms, and ($a_2$) a fatty acid ester containing at least one alcoholic hydroxyl group which is obtained from a higher fatty acid having from 12 to 22 carbon atoms and an aliphatic polyhydric alcohol.

15. The laminated resin film as claimed in claim 14, wherein said glyceride ($a_1$) is selected from the group consisting of glycerol diacetate monooleate, glycerol diacetate monolaurate, glycerol diacetate monopalmitate, glycerol monoacetate dioleate, glycerol monoacetate dilaurate, glycerol monoacetate monopalmitate, glycerol monoacetate monooleate, glycerol monoacetate monolaurate, glycerol monoacetate monocaprylate, glycerol monoacetate brassidate, glycerol monopropionate monobrassidate, glycerol monoacetate monoerucate, and glycerol dipropionate monolaurate.

16. The laminated resin film as claimed in claim 14, wherein said fatty acid ester ($a_2$) is an ester derived from a polyhydric alcohol selected from the group consisting of glycerol, polyglycerol, sorbitol, pentaerythritol, propylene glycol, polyethylene glycol, and polypropylene glycol and a higher fatty acid selected from the group consisting of oleic acid, linoleic acid, and lauric acid.

17. The laminated resin film as claimed in claim 14, wherein said fatty acid ester is selected from the group consisting of glycerol monooleate, polyglycerol oleate, glycerol mono- or diricinoleate, propylene glycol oleate, propylene glycol laurate, pentaerythritol oleate, polyethylene glycol oleate, polypropylene glycol oleate, sorbitan oleate, sorbitan laurate, polyethylene glycol sorbitan oleate, polyethylene glycol sorbitan laurate, and polyglycerol polyricinolate.

18. The laminated resin film as claimed in claim 14, wherein the nonionic surface active agent which is present in layer (B) is liquid polyglycerol polyricinoleate and the nonionic surface active agent which is present in layer (A) is glycerol diacetate monolaurate.

19. The laminated resin film as claimed in claim 14, wherein said nonionic surface active agent is a mixture of said glyceride ($a_1$) and said fatty acid ester ($a_2$) at an ($a_1$) to ($a_2$) weight ratio of from 2/8 to 8/2.

20. The laminated resin film as claimed in claim 19, wherein said nonionic surface active agent is a mixture of polyglycerol oleate and glycerol diacetate monolaurate.

21. The laminated resin film as claimed in claim 1, wherein said film has a haze of not more than 3% and an Elmendorf tear strength of from 2 to 250 kg/cm in the machine direction and of from 2 to 50 kg/cm in the transverse direction.

* * * * *